United States Patent
Riguer

(10) Patent No.: US 11,620,724 B2
(45) Date of Patent: Apr. 4, 2023

(54) CACHE REPLACEMENT POLICY FOR RAY TRACING

(71) Applicant: ATI Technologies ULC, Markham (CA)

(72) Inventor: Guennadi Riguer, Markham (CA)

(73) Assignee: ATI Technologies ULC, Ontario (CA)

( * ) Notice: Subject to any disclaimer, the term of this patent is extended or adjusted under 35 U.S.C. 154(b) by 0 days.

(21) Appl. No.: 17/033,011

(22) Filed: Sep. 25, 2020

(65) Prior Publication Data

US 2022/0101483 A1    Mar. 31, 2022

(51) Int. Cl.
*G06T 1/60* (2006.01)
*G06T 17/10* (2006.01)
*G06T 15/06* (2011.01)

(52) U.S. Cl.
CPC ............... *G06T 1/60* (2013.01); *G06T 15/06* (2013.01); *G06T 17/10* (2013.01)

(58) Field of Classification Search
CPC ......... G06T 15/06; G06T 15/005; G06T 1/60; G06T 17/005; G06T 9/40; G06F 12/0875; G06F 12/0802; G06F 12/0808; G06F 12/0811; G06F 12/0871; G06F 12/0895; G06F 12/1045; G06F 12/123; G09G 2360/121
See application file for complete search history.

(56) References Cited

U.S. PATENT DOCUMENTS

| | | | |
|---|---|---|---|
| 2013/0254491 A1* | 9/2013 | Coleman | G06F 12/123 711/133 |
| 2016/0027204 A1* | 1/2016 | Lee | G06T 15/06 345/426 |
| 2020/0050550 A1* | 2/2020 | Muthler | G06F 12/0875 |

OTHER PUBLICATIONS

Jaleel, A., et al., "High Performance Cache Replacement Using Re-Reference Interval Prediction (RRIP)", ISCA 10, ACM, 12 pgs., Jun. 2010.

* cited by examiner

*Primary Examiner* — Hau H Nguyen
(74) *Attorney, Agent, or Firm* — Volpe Koenig

(57) ABSTRACT

Some implementations provide systems, devices, and methods for implementing a cache replacement policy. A memory request is issued for attribute information associated with a node in an acceleration data structure. The attribute information associated with the node is inserted into a cache entry of the cache and an age associated with the cache entry is set to a value based on the attribute information, in response to the memory request causing a cache miss.

20 Claims, 6 Drawing Sheets

CACHE REPLACEMENT POLICY FOR RAY TRACING

BACKGROUND

In 3D computer graphics, ray tracing is a rendering technique for generating an image by determining the path that a ray of light would take from a light source in a 3D model to an object in the 3D model that it would strike, and determining the effect of the ray of light on the color or other attributes of the object, according to the model.

Objects in the 3D model are typically represented as groups of polygons. The polygons are typically referred to as primitives in this context. Such polygons are typically triangles, each represented by three vertices. Other types of polygon primitives are used in some cases. Each vertex includes information or "attributes" defining its position in three-dimensional (3D) space, and in some implementations, includes other information, such as color, normal vector, and/or texture information pertaining to the polygon, for example.

The attributes are stored in a cache memory in some cases to facilitate retrieval of the information faster than retrieving the information from the main memory. Such circumstances include where the polygon is requested from the main memory, or is predicted to be requested from the main memory. The attributes are stored in one or more locations in the cache memory referred to as cache entries.

Cache memory is typically faster and closer to the processor than the main memory or backing store. The cache memory is also typically smaller than the main memory however. Accordingly, the cache memory becomes completely full during execution of a program in some cases. If information about a polygon is requested from main memory, or predicted to be requested from main memory and is not already cached, other information that is stored in the cache is evicted from the cache to free space for the new information in some cases.

Which cache entry to evict is typically determined based on a cache replacement policy. "Least recently used" (LRU) is an example of a cache replacement policy, where the least recently accessed cache entry is evicted to make room to store the new information. In some cases, a simple LRU cache replacement policy evicts cache entries that are accessed again later. In some cases, evicting and re-caching such entries results in inefficiencies as compared with implementing a cache replacement policy that does not evict such entries in the first place.

BRIEF DESCRIPTION OF THE DRAWINGS

A more detailed understanding can be had from the following description, given by way of example in conjunction with the accompanying drawings wherein.

DETAILED DESCRIPTION

Figure 1:
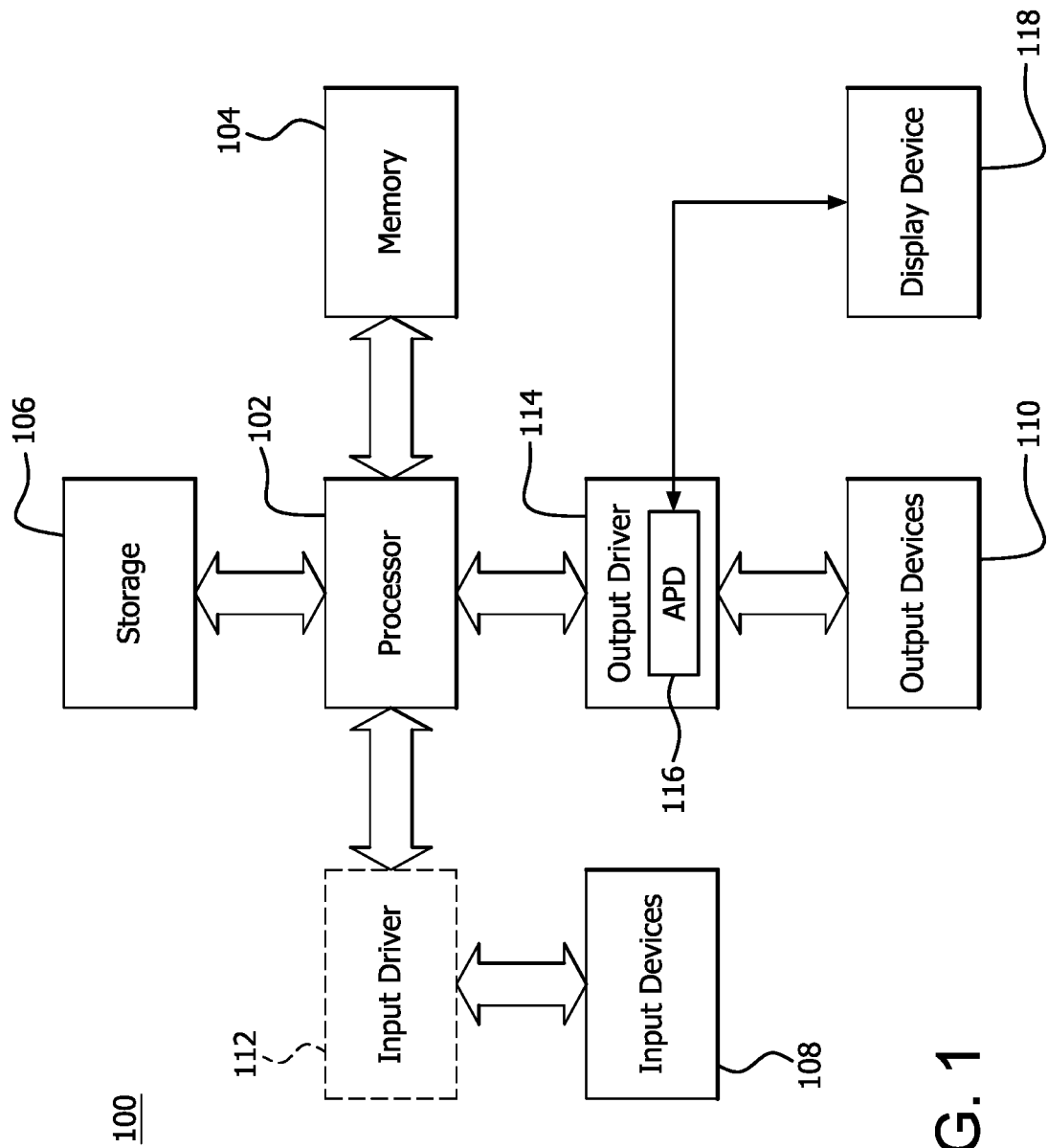
FIG. 1 is a block diagram of an example device in which one or more features of the disclosure can be implemented.

Some implementations provide a processor configured to implement a cache replacement policy. The processor includes circuitry configured to issue a memory request for attribute information associated with a node in an acceleration data structure. The processor also includes circuitry configured to insert the attribute information associated with the node into a cache entry of the cache, and set an age associated with the cache entry to a value based on the attribute information, in response to the memory request causing a cache miss.

In some implementations, the attribute information includes metadata associated with the acceleration data structure and the age is set based on the metadata. In some implementations, the attribute information includes information associated with a level of the node within the acceleration data structure and the age is set based on the information associated with the level of the node. In some implementations, the attribute information includes information associated with a parent of the node within the acceleration data structure and the age is set based on the information associated with the information associated with the parent. In some implementations, the processor includes circuitry configured to set the age associated with the cache entry to a value based on the attribute information, in response to the request hitting the cache. In some implementations, the processor includes circuitry configured to set the age associated with the cache entry to a value associated with a cache hit, in response to the request hitting the cache. In some implementations, the processor includes circuitry configured to evict information from the cache entry prior to inserting the attribute information associated with the node into the cache entry, in response to the request missing the cache. In some implementations, the processor includes circuitry configured to be responsive to the request missing the cache, determine the cache entry from among a plurality of entries of the cache based on the age associated with the cache entry.

Some implementations provide a method for implementing a cache replacement policy. A memory request is issued for attribute information associated with a node in an acceleration data structure. The attribute information associated with the node is inserted into a cache entry of the cache and an age associated with the cache entry is set to a value based on the attribute information, in response to the memory request causing a cache miss.

In some implementations, the attribute information includes metadata associated with the acceleration data structure and the age is set based on the metadata. In some implementations, the attribute information includes information associated with a level of the node within the acceleration data structure and the age is set based on the information associated with the level of the node. In some implementations, the attribute information includes information associated with a parent of the node within the acceleration data structure and the age is set based on the information associated with the information associated with the parent. In some implementations the method includes setting the age associated with the cache entry to a value based on the attribute information, in response to the request hitting the cache. In some implementations the method includes setting the age associated with the cache entry to a value associated with a cache hit, in response to the request hitting the cache. In some implementations the method includes evicting information from the cache entry prior to inserting the attribute information associated with the node into the cache entry, responsive to the request missing the cache. In some implementations the method includes determining the cache entry from among a plurality of entries of the cache based on the age associated with the cache entry in response to the request causing a cache miss.

Some implementations provide a processor configured to perform ray tracing. The processor includes circuitry configured to cast a ray through a three dimensional (3D) model space. The processor also includes circuitry configured to determine an intersection between the ray and a primitive within the 3D model space. The primitive is associated with a node in an acceleration data structure. The processor also includes circuitry configured to issue a memory request for attribute information associated with the primitive. The processor also includes circuitry configured to insert the attribute information associated with the primitive into a cache entry of the cache and to set an age associated with the cache entry to a value based on the attribute information, in response to the memory request missing a cache.

In some implementations, the attribute information includes metadata associated with the acceleration data structure and the age is set based on the metadata. In some implementations, the attribute information includes information associated with a level of the node within the acceleration data structure and the age is set based on the information associated with the level of the node. In some implementations, the attribute information includes information associated with a parent of the node within the acceleration data structure and the age is set based on the information associated with the information associated with the parent.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
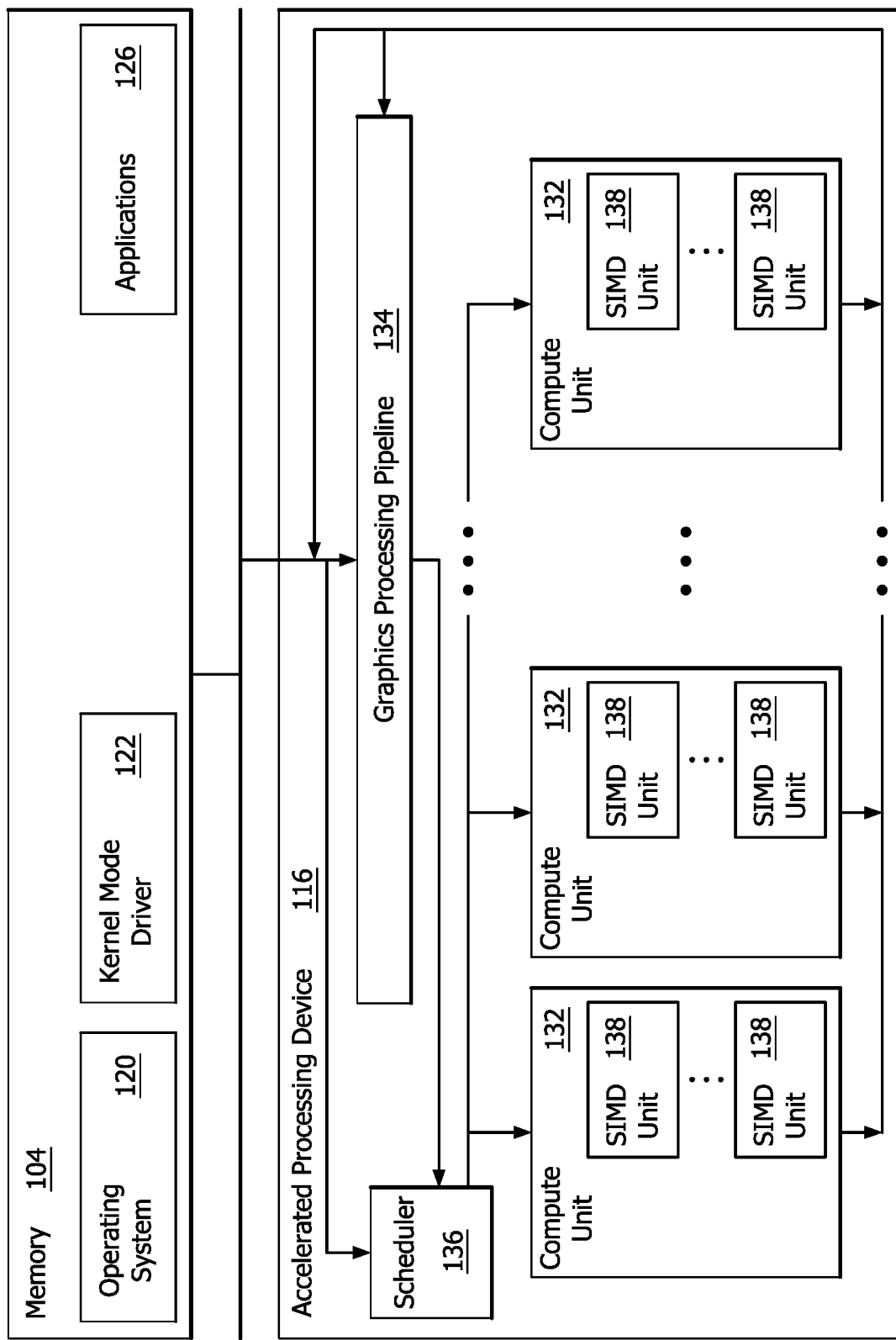
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
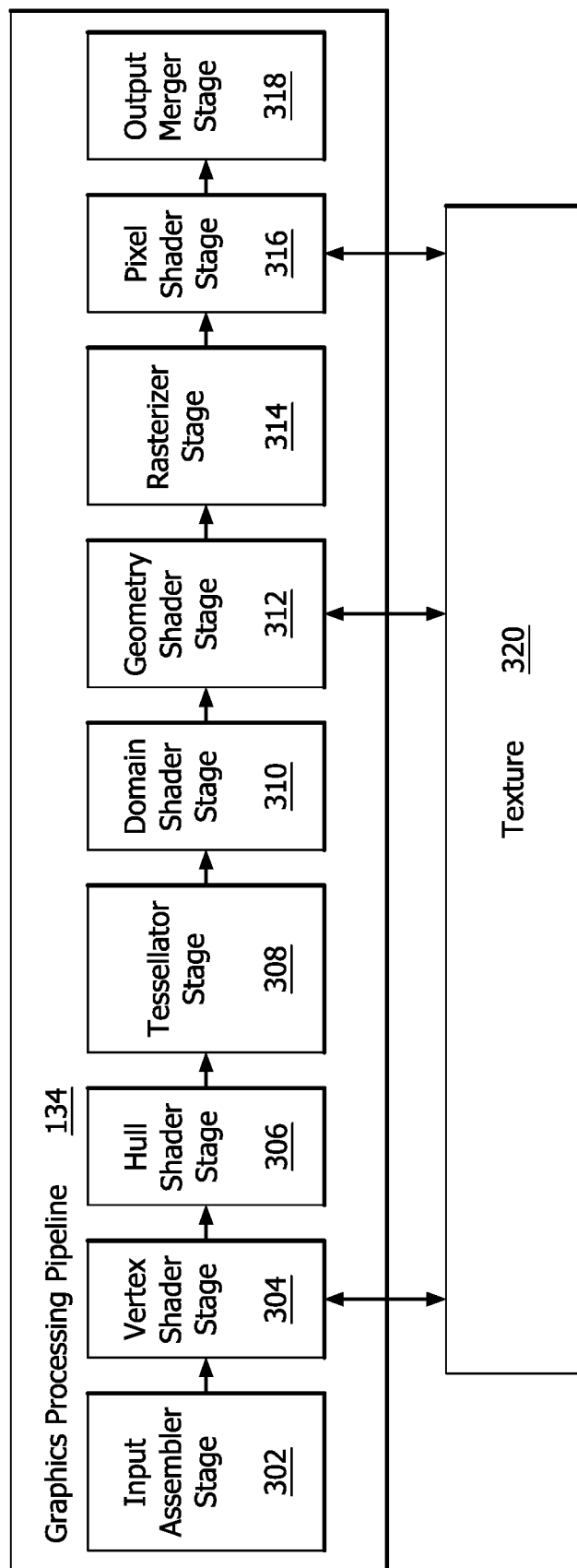
FIG. 3 is a block diagram illustrating a graphics processing pipeline, according to an example.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. In some instances, a shader program that executes on the programmable processing units 202 perform operations for the geometry shader stage 312.

The rasterizer stage 314 accepts and rasterizes simple primitives generated upstream. Rasterization includes determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel.

Texture data, which defines textures, are stored and/or accessed by the texture unit 320. Textures are bitmap images that are used at various points in the graphics processing pipeline 134. For example, in some instances, the pixel shader stage 316 applies textures to pixels to improve apparent rendering complexity (e.g., to provide a more "photorealistic" look) without increasing the number of vertices to be rendered.

In some instances, the vertex shader stage 304 uses texture data from the texture unit 320 to modify primitives to increase complexity, by, for example, creating or modifying vertices for improved aesthetics. In one example, the vertex shader stage 304 uses a height map stored in the texture unit 320 to modify displacement of vertices. This type of technique can be used, for example, to generate more realistic looking water as compared with textures only being used in the pixel shader stage 316, by modifying the position and number of vertices used to render the water. In some instances, the geometry shader stage 312 accesses texture data from the texture unit 320.

The performance of various computing operations in general, and specifically ray tracing in a GPU, is increased in some cases by caching frequently used data in high speed special purpose memory. Ray tracing is a computer graphics technique for increasing the realism of scene lighting. Ray tracing entails, among other things, determining whether a trajectory of a ray of light from a light source in the 3D model intersects with any objects in the 3D model. This determination is referred to as an intersection test. In order to test for intersection, information about the trajectory is compared with position information for all of the object primitives in the 3D model.

In some cases, attribute information (e.g., position information such as x, y, z, coordinates, color, texture, etc.) for all of the primitives in an entire 3D model exceeds the size of a cache or other local memory used to store this information for processing. Accordingly, as mentioned above, it is advantageous to test subsections or subsets of the entire 3D model for intersections before testing the primitives, in some implementations. Such subsections or subsets of a frame can be referred to as bounding volumes. Bounding volumes are regions of the 3D model that typically enclose or bound one or more primitives. Bounding volumes also enclose other bounding volumes in some implementations. If a light ray does not intersect a bounding volume, it is inferred that the light ray does not intersect any of the primitives enclosed by that bounding volume, reducing the overall number of intersection test calculations in some cases.

Because the bounding volumes are subsets of the entire 3D model space, and because the primitives (and in some cases, other bounding volumes) are bounded within bounding volumes, the hierarchy of 3D model space, bounding volumes, and primitives is representable using a data structure, such as a tree. Intersection testing proceeds by traversing the tree to test each node for intersections. If the ray does not intersect the bounding volume represented by a current node, for example, it is not necessary for the intersection testing to proceed to children of that node.

If the ray tracing acceleration structure is traversed for several rays, the nodes of the structure are traversed more than once. Accordingly, some implementations cache the position or other attribute information of bounding volumes and/or primitives that are tested for intersection. This can have the advantage of increasing the speed of access if the same bounding volume or primitive is intersection tested for another ray. It is noted that in some implementations, the cache is not large enough to cache all of the position information for all of the bounding volumes and primitives in the 3D model space. Accordingly, cached position information is evicted to make space to cache other position information in some cases.

Due to the hierarchical arrangement of the volumes and primitives in the 3D model space, some bounding volumes and/or primitives are intersected and/or tested more often than others. Accordingly, in terms of the acceleration data structure, the leaf nodes of the structure (or lower nodes in general) are traversed a relatively fewer number of times in some cases, whereas the root (or upper nodes in general) are traversed a relatively greater times, or every time, in the case of the root nodes. Accordingly, in some implementations, it is preferable to cache position information for higher nodes and/or to bias the cache eviction policy to preferentially evict position information for leaf nodes, or lower nodes in general.

Accordingly, it may be desired to implement a cache eviction policy based on attributes of the acceleration structure. One example static cache eviction policy for traversing a RTAS includes not caching leaf (i.e., nodes having no child nodes) nodes, and caching upper (i.e., non-leaf nodes, having at least one child node) nodes using LRU or another cache eviction policy.

Figure 4:
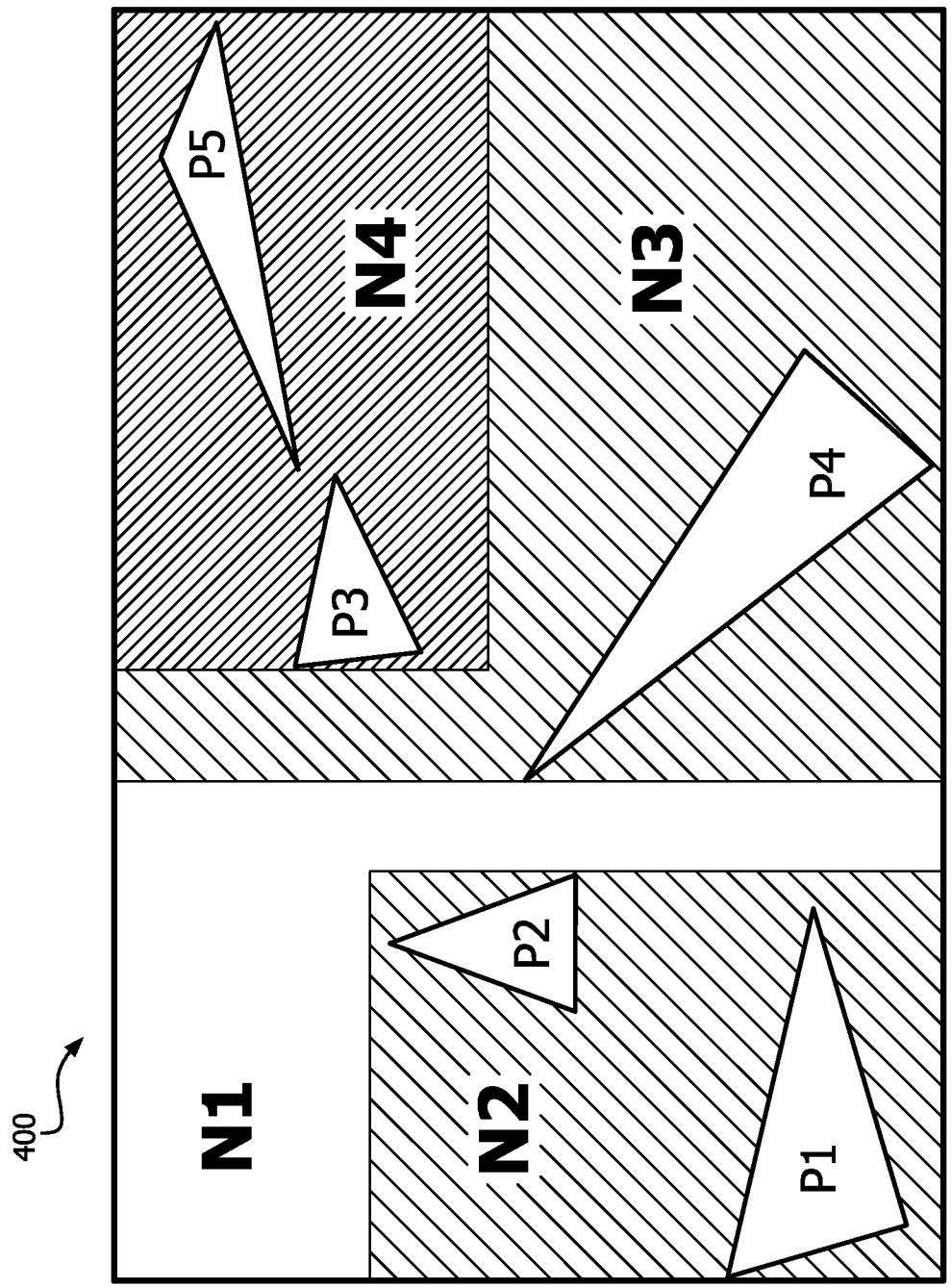
FIG. 4 is a 2-dimensional (2D) projection of a 3-dimensional (3D) model space.

FIG. 4 is a 2D projection of a 3D model space 400. 3D model space 400 includes primitives P1, P2, P3, P4, and P5. 3D model space 400 is divided into bounding volumes N1, N2, N3, and N4. Bounding volume N1 includes the entirety of 3D model space 400. Bounding volumes N2 and N3 are sub-volumes of 3D model space 400, and thus are subsets of bounding volume N1. Bounding volume N3 includes bounding volume N4, which is thus a subset of bounding volume N3, and of bounding volume N1. Bounding volumes N1, N2, N3, and N4 are referred to as hierarchical bounding volumes since certain bounding volumes are subsets of other bounding volumes.

Primitives P1, P2, P3, P4, and P5 are all necessarily within bounding volume N1, since bounding volume N1 includes the entire 3D model space 400. Primitives P1 and P2 are within bounding volume N2. Since primitives P1 and P2 are within bounding volume N2, they are also necessarily within bounding volume N1, since bounding volume N2 is a subset of bounding volume N1. Primitives P3, P4, and P5 are within bounding volume N3. Since primitives P3, P4, and P5 are within bounding volume N3, they are also necessarily within bounding volume N1, since bounding volume N3 is a subset of bounding volume N1. Primitives P4, and P5 are within bounding volume N3. Since primitives P3, P4, and P5 are within bounding volume N3, they are also necessarily within bounding volume N1, since bounding volume N3 is a subset of bounding volume N1.

In some implementations, the position of the bounding volumes and primitives is defined within the 3D model space by its attribute information. For example, each bounding volume and primitive includes x, y, and z coordinate position information relative to the 3D model space in some implementations. In some implementations, the attribute information also includes metadata relating to the acceleration data structure. For example, in some implementations, the metadata information includes information describing the position of the node and/or other nodes within the data structure.

Figure 5:
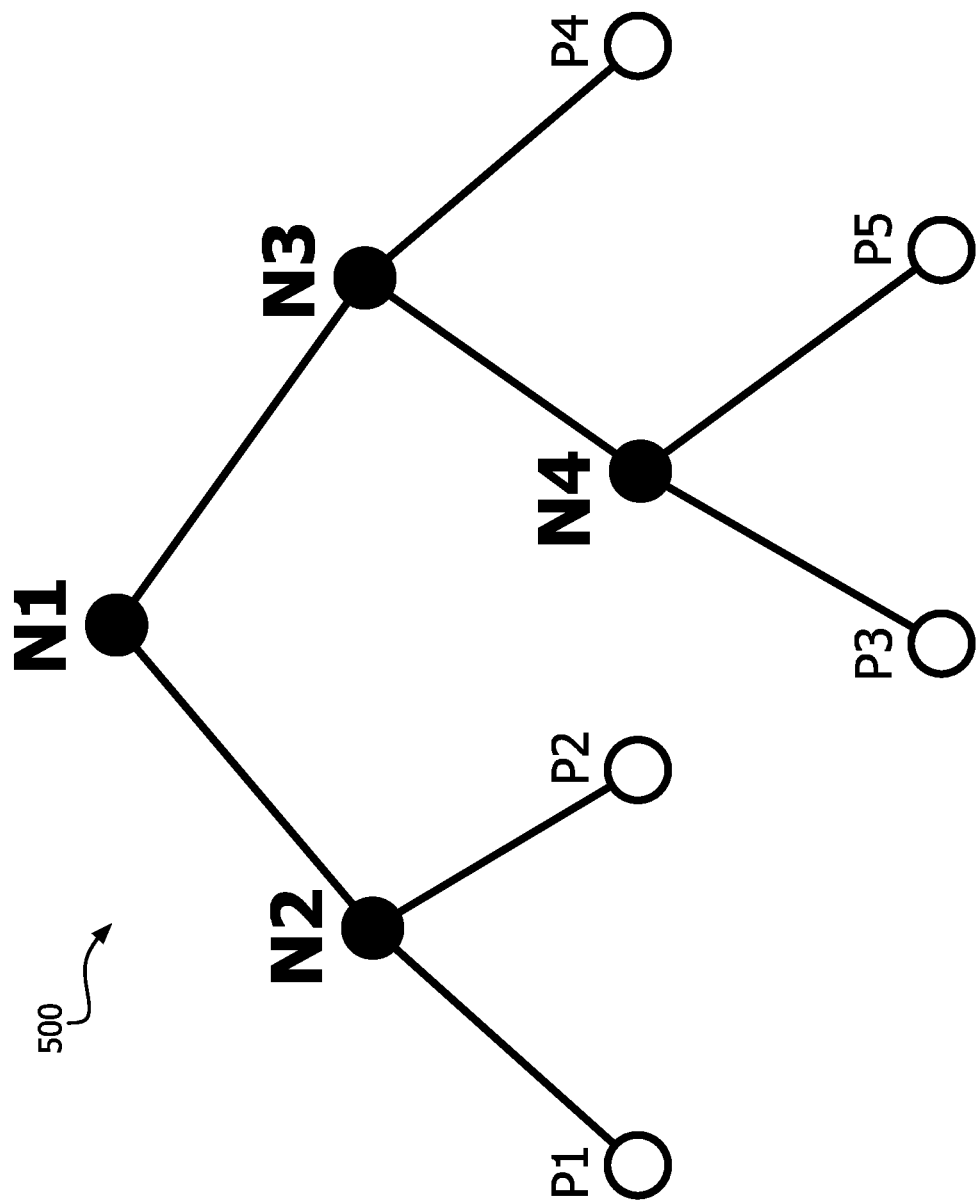
FIG. 5 is a tree diagram illustrating an example acceleration structure.

FIG. 5 is a tree diagram illustrating an example acceleration data structure 500. Acceleration data structure 500 is a binary tree data structure illustrating the hierarchy of bounding volumes N1, N2, N3, and N4 and primitives P1, P2, P3, P4, and P5 shown and described with respect to FIG. 4. Acceleration data structure 500 is used for ray tracing, and can be referred to as a ray tracing acceleration structure (RTAS). Various examples are discussed herein with respect to ray tracing for convenience and ease of description, however it is noted that the techniques discussed herein are applicable to any other suitable data structure, used for any other suitable purpose.

Bounding volume N1 is the root or top of acceleration data structure 500. Bounding volumes N2 and N3 are child nodes of bounding volume N1, but are not leaf nodes as they each have at least one child node. Bounding volume N4 is a child node of bounding volume N3, but is not a leaf node as it has at least one child node. Primitives P1 and P2 are leaf nodes which are children of bounding volume N2. Primitive P4 is a leaf node which is a child of bounding volume N3. Primitives P3 and P5 are leaf nodes which are children of bounding volume N4, and also of bounding volume N3, of which bounding volume N4 is a subset.

In some implementations, each node is associated with metadata indicating its relationship with the acceleration data structure 500, such as the level within the data structure. For example, in some implementations, bounding volume N1 is associated with metadata indicting that it is the root of acceleration data structure 500, bounding volume N2 is associated with metadata indicating that it is within the first level of acceleration data structure 500 and/or is a child of root N1, and/or is a parent of primitives P1 and P2. Primitive P1 is associated with metadata indicating that it is at the second level of the tree and/or is a child of bounding volume N2, and/or is a leaf node (i.e., has no child nodes), and so forth for each of the other nodes of acceleration data structure 500. In some implementations, the metadata is maintained as an attribute of the node. For example, attributes of primitive P1 include x, y, z, position information, color information, and texture information for each of its vertices, and the metadata indicating its level in the hierarchy of acceleration data structure 500.

Acceleration data structure 500 illustrates an example hierarchy for improving tests for intersection between a ray and primitives P1, P2, P3, P4, and P5 using bounding volumes N1, N2, N3, and N4. The test for intersection is typically conducted based on trajectory and/or position information describing the light ray, and position information for the primitives and bounding volumes in the 3D model space. In the absence of bounding volumes, each primitive would typically be tested individually for intersection with the ray. In some cases, this would make the number of intersection tests be prohibitively high, reducing performance. By incorporating bounding volumes, it is possible to test fewer intersections in some cases.

For example, if an example ray were cast through 3D model space 400, an intersection test would first be conducted for bounding volume N1, the root of the tree. The intersection test is based on the trajectory or other position information associated with the ray, and position information associated with the bounding volume N1. Accordingly, the position information is retrieved from memory to perform the intersection test, or from a cache in some cases, if available. Since N1 includes the entire volume of the 3D model space 400 (as shown and described with respect to FIG. 4), the intersection test will be positive if the ray intersects any area of the 3D model space, if the model space includes any primitives at all. Assuming this is the case, the intersection test continues to traverse the tree to the next level.

Starting from leftmost nodes as a convenient example, the intersection test is next conducted for bounding volume N2. The intersection test is based on the trajectory or other position information associated with the ray, and position information associated with the bounding volume N2. Accordingly, the position information is retrieved from memory to perform the intersection test, or from a cache in some cases, if available. If the ray does not intersect any area of N2, the intersection test is not conducted for primitives P1 or P2, since they have been excluded by the negative result of the test of bounding volume N2. This is illustrated in the acceleration data structure 500 in that P1 and P2 are child nodes of bounding volume N2. Avoiding the need to individually test both P1 and P2 for intersection with the ray improves performance by reducing the number of required computations in some cases. On the other hand, if the ray does intersect bounding volume N2, the intersection test is conducted for P1, and then for P2 to determine if one or both primitives are intersected by the ray. Each of these intersection tests is based on the trajectory or other position information associated with the ray, and position information associated with the primitives P1 and P2 respectively. Accordingly, the position information is retrieved from memory to perform each intersection test, or from a cache in some cases, if available. If the ray is found to intersect with primitive P1 or P2, the intersection test concludes, since the ray is assumed to intersect with only one primitive in this example. In this example, the intersection test ends with the first detected intersection (e.g., a simple test for whether the ray intersects with any primitives). It is noted that in other examples, the intersection test continues through the entire tree regardless of whether an intersection is detected (e.g., a test for the foremost intersected primitive, where all intersected primitives are detected and the intersection closest to the origin of the ray is identified).

It is possible for the ray to intersect bounding volume N3 regardless of whether the ray intersects bounding volume N2. This is illustrated in the acceleration data structure 500 in that N3 is not a child node of N2. Accordingly, the intersection test is next conducted for bounding volume N3 in either case. The intersection test is based on the trajectory or other position information associated with the ray, and position information associated with the bounding volume N3. Accordingly, the position information is retrieved from memory to perform the intersection test, or from a cache in some cases, if available. If the ray does not intersect any area of N3, the intersection test is not conducted for bounding volume N4, or primitives P3, P5, or P4, since they have been excluded by the negative result of the test of bounding volume N3. This exclusion is illustrated in the acceleration data structure 500 in that P4, N4, and by extension, P3 and P5, are child nodes of bounding volume N3.

On the other hand, if the ray does intersect bounding volume N3, the intersection test is conducted for N4 to determine if this bounding volume is intersected by the ray. The intersection test is based on the trajectory or other position information associated with the ray, and position information associated with the bounding volume N4. Accordingly, the position information is retrieved from memory to perform the intersection test, or from a cache in some cases, if available. If the ray does not intersect any area of N4, the intersection test is not conducted for primitives P3 or P5 since they have been excluded by the negative result of the test of bounding volume N4. This exclusion is illustrated in the acceleration data structure 500 in that P3 and P5 are child nodes of bounding volume N4. On the other hand, if the ray does intersect bounding volume N4, the intersection test is conducted for primitives P3 and P5 to determine if these primitives are intersected by the ray. If the ray is found to intersect with primitive P3 or P5, the intersection test concludes, since the ray is assumed to intersect with only one primitive in this example.

It is possible for the ray to intersect primitive P4 regardless of whether the ray intersects bounding volume N4 and/or primitives P3 and/or P5. This is illustrated in the acceleration data structure 500 in that primitive P4 is not a child node of bounding volume N4 or primitives P3 or P5. Accordingly, the intersection test is next conducted for primitive P4 in either case. The intersection test is based on the trajectory or other position information associated with the ray, and position information associated with the primitive P4. Accordingly, the position information is retrieved from memory to perform the intersection test, or from a cache in some cases, if available.

Regardless of whether or not the ray intersects any area of primitive P4, the intersection test concludes, since the tree has been fully traversed. Acceleration data structure 500 is traversed in this way for each light ray that is desired to be traced. Accordingly, memory latency, bandwidth, and/or other performance advantages are obtainable in some cases by appropriately caching the attribute information (e.g., position information) of the primitives and bounding volumes.

Table 1 illustrates example memory requests and cache operations for an example cache having three entries, using an example simple least-recently-used (LRU) cache replacement policy. It is noted that these memory requests are not exemplary of ray tracing operations, but rather, are used to efficiently illustrate the behavior of the cache using this cache replacement policy and the acceleration data structure 500. In the LRU policy, node attributes are added to the cache in an entry that is marked as having the lowest age. If at least one of the cache entries already contains cached node attributes, the age of the cached entry or entries are updated (e.g., by updating a pointer, counter, flag, or any other suitable cache eviction policy management mechanism) as progressively older; i.e., less recently used. If the cache is full, the LRU entry is evicted to make space for the new entry. An increase in age of a cache entry in Table 1 is shown by moving it from its current column to the right. On a cache hit, the age of the cache entry is decreased by moving it to the leftmost column and updating the other cache entries accordingly.

TABLE 1

| Memory Request | Newest Cache Entry | Cache Entry | Oldest Cache Entry | Cache Hit or Miss? |
|---|---|---|---|---|
| N1 | Invalid | Invalid | Invalid | Miss |
| N2 | N1 | Invalid | Invalid | Miss |
| P1 | N2 | N1 | Invalid | Miss |
| N1 | P1 | N2 | N1 | Hit |
| N2 | N1 | P1 | N2 | Hit |
| P2 | N2 | N1 | P1 | Miss |
| N1 | P2 | N2 | N1 | Hit |
| N3 | N1 | P2 | N2 | Miss |
| N4 | N3 | N1 | P2 | Miss |
| P3 | N4 | N3 | N1 | Miss |
| N1 | P3 | N4 | N3 | Miss*** |
| N3 | N1 | P3 | N4 | Miss*** |
| N4 | N3 | N1 | P3 | Miss*** |
| P5 | N4 | N3 | N1 | Miss |
| N1 | P5 | N4 | N3 | Miss*** |
| N3 | N1 | P5 | N4 | Miss*** |
| P4 | N3 | N1 | P5 | Miss |
|  | P4 | N3 | N1 |  |

When a ray tracing acceleration data structure is traversed, the leaf nodes of the RTAS (e.g., primitives P1, P2, P3, P4, and P5 in acceleration data structure 500) are typically accessed less often than higher level or top level nodes (e.g., bounding volumes N2, N3, or bounding volume N1 in acceleration data structure 500). Accordingly, caching attribute information of lower level nodes pollutes the cache in some cases. This is illustrated by the thrash illustrated in Table 1, where the cache misses marked "Miss***" indicate attributes that were previously cached and evicted under the LRU cache replacement policy. Thrash refers to the behavior of a cache where entries are evicted only to be re-cached, which can negatively affect performance.

One possible approach to mitigating this pollution effect is to statically select a cache replacement policy based on the node level in the acceleration structure. In one example, the cache replacement policy indicates that leaf nodes are uncached, whereas nodes higher in the structure than the leaf nodes are cached using LRU or another suitable cache policy.

Another example approach applies a re-reference interval prediction (RRIP) cache eviction policy to improve cache performance over a simple LRU policy. RRIP cache replacement is described, for example, in High Performance Cache Replacement Using Re-Reference Interval Prediction (RRIP), Jaleel et al., ISCA '10, June 19-23, Saint-Malo, France, the contents of which are incorporated by reference in their entirety as if fully set forth herein.

Re-reference interval prediction is a prediction of the time or order in which a cache entry is accessed. Using this terminology, a LRU cache eviction policy can be described as predicting an order in which cache blocks are expected to be re-referenced. The MRU cache block is predicted to be re-referenced the soonest. The MRU block can be said to have a relatively "immediate" predicted re-reference interval. The LRU block is predicted to be re-referenced the latest, and can be said to have a relatively "distant" predicted re-reference interval. Other cache eviction policies are implementable using other RRIP strategies.

For example, Table 2 illustrates example memory requests and cache operations for an example cache having three entries, and which implements an example RRIP cache replacement policy. It is noted that these memory requests are not exemplary of ray tracing operations, but rather, are used to illustrate the behavior of the cache using this cache replacement policy and the acceleration data structure 500. In this example, each cache entry is associated with two age bits, which store an age value of 0, 1, 2, or 3. In other implementations, other numbers of age bits are usable. In some cases, these age bits are referred to as re-reference prediction values (RRPV).

TABLE 2

| Memory Request | Cache Entry | Cache Entry | Cache Entry | Hit or Miss? |
|---|---|---|---|---|
| N1 | Invalid (3) | Invalid (3) | Invalid (3) | Miss |
| N2 | N1 (2) | Invalid (3) | Invalid (3) | Miss |
| P1 | N1 (2) | N2 (2) | Invalid (3) | Miss |
| N1 | N1 (2) | N2 (2) | P1 (2) | Hit |
| N2 | N1 (0) | N2 (2) | P1 (2) | Hit |
| P2 | N1 (0) | N2 (0) | P1 (2) | Miss |
| N1 | N1 (1) | N2 (1) | P2 (2) | Hit |
| N3 | N1 (0) | N2 (1) | P2 (2) | Miss |
| N4 | N1 (1) | N2 (2) | N3 (2) | Miss |
| P3 | N1 (2) | N4 (2) | N3 (3) | Miss |
| N1 | N1 (2) | N4 (2) | P3 (2) | Hit |
| N3 | N1 (0) | N4 (2) | P3 (2) | Miss*** |
| N4 | N1 (1) | N3 (2) | P3 (3) | Miss*** |
| P5 | N1 (1) | N3 (2) | N4 (2) | Miss |

TABLE 2-continued

| Memory Request | Cache Entry | Cache Entry | Cache Entry | Hit or Miss? |
|---|---|---|---|---|
| N1 | N1 (2) | P5 (2) | N4 (3) | Hit |
| N3 | N1 (0) | P5 (2) | N4 (3) | Miss*** |
| P4 | N1 (0) | P5 (2) | N3 (2) | Miss |
|  | N1 (1) | P4 (2) | N3 (3) |  |

In this example, the cache entries all begin in an invalid state, each with an age of the highest value "3". On a memory request for node attributes (e.g., position information for a ray-tracing intersection test), the cache is checked to determine whether the node attributes are currently stored in the cache. If the node attributes are not currently stored in the cache, the request is said to "miss" the cache. If the node attributes are found to be currently stored in the cache, the request is said to "hit" the cache.

On a cache miss, the age value of each cache entry is checked, in order (e.g., starting from the left in the table), to determine whether any of the ages have the highest value of "3". If none of the cache blocks is found to have an age of the highest value "3", all of the ages are incremented, and the age value of each cache entry is checked again, in order, to determine whether any of the ages have the highest value "3". This continues until one of the ages is found to have the highest value "3". If one of the cache blocks is found to have the highest value "3", the contents of the first one of such blocks in the order (e.g., first from the left in the table in this example) is replaced with the requested attribute values from memory, and the age of this block is set to "2" in this example. This assigned age can be referred to as an "insertion age". Inserting the cache entry with an age between the greatest and lowest possible ages in this example can be said to represent a prediction that the cache block has a relatively "intermediate" predicted re-reference interval.

On a cache hit, the age value of the cache block in which the node attributes are stored is set to the lowest value of "0". This can be said to represent a prediction that this cache block, which has been re-referenced, has a relatively "immediate" predicted re-reference interval—i.e., it is likely to be used again soon. Setting the value to 0 prevents the cache block from being evicted immediately, which can have the advantage of avoiding thrash in some cases.

The RRIP strategy described above and illustrated with respect to Table 2 provides improved performance over the LRU strategy of Table 1. This is illustrated by the relatively less amount of thrash illustrated in Table 1, where there are fewer cache misses marked "Miss***" indicating attributes that were previously cached and evicted under the LRU cache replacement policy. The improved performance is also illustrated by the relatively fewer number of cache misses overall.

It is noted that in some cases the number of accesses at different acceleration structure levels depends on a number of factors. Accordingly, some implementations tune the RRIP cache eviction policy to further improve cache performance for the acceleration structure. For example, the RRIP cache eviction policy is tunable to access patterns frequently observed in ray tracing workloads in some implementations.

In the example of Table 2, RRIP maintains a 2-bit age for the cache blocks. The age is reset on hit (becomes 0) and is inserted at a non-zero age (2 in this example) on a miss. This favors retention of data that has been hit on the cache. In some implementations, RRIP is enhanced for traversal of the acceleration structure by evicting blocks that are accessed only once, or relatively fewer times, and retaining blocks that have been accessed numerous times, or relatively more times. For example, in some implementations, the insertion age is varied. In some implementations, the insertion age is based on ages of currently cached blocks and/or on heuristics associated with the acceleration structure, such as node level. In some implementations, the block age is decremented on hit instead of resetting it to 0. In some implementations, the amount of decrement is based on heuristics associated with the acceleration structure, such as node level.

Table 3 illustrates example memory requests and cache operations for an example cache having three entries, and which implements an example tuned RRIP cache replacement policy. It is noted that these memory requests are not exemplary of ray tracing operations, but rather, are used to illustrate the behavior of the cache using this cache replacement policy and the acceleration data structure 500. In this example, each cache entry is associated with two age bits, which store an age value of 0, 1, 2, or 3. In other implementations, other numbers of age bits are usable.

TABLE 3

| Memory Request | Cache Entry | Cache Entry | Cache Entry | Hit or Miss? |
|---|---|---|---|---|
| N1 (1) | Invalid (3) | Invalid (3) | Invalid (3) | Miss |
| N2 | N1 (1) | Invalid (3) | Invalid (3) | Miss |
| P1 (2) | N1 (1) | N2 (1) | Invalid (3) | Miss |
| N1 | N1 (1) | N2 (1) | P1 (2) | Hit |
| N2 | N1 (0) | N2 (1) | P1 (2) | Hit |
| P2 | N1 (0) | N2 (0) | P1 (2) | Miss |
| N1 | N1 (1) | N2 (1) | P2 (2) | Hit |
| N3 | N1 (0) | N2 (1) | P2 (2) | Miss |
| N4 | N1 (1) | N2 (2) | N3 (1) | Miss |
| P3 (3) | N1 (2) | N4 (2) | N3 (2) | Miss |
| N1 | P3 (3) | N4 (3) | N3 (3) | Miss*** |
| N3 | N1 (1) | N4 (3) | N3 (3) | Hit |
| N4 | N1 (1) | N4 (3) | N3 (0) | Hit |
| P5 | N1 (1) | N4 (0) | N3 (0) | Miss |
| N1 | P5 (3) | N4 (2) | N3 (2) | Miss*** |
| N3 | N1 (1) | N4 (2) | N3 (2) | Hit |
| P4 | N1 (1) | N4 (2) | N3 (0) | Miss |
|  | N1 (2) | P4(2) | N3 (1) |  |

In this example, the cache entries all begin in an invalid state, each with an age of the highest value "3". On a memory request for node attributes (e.g., position information for a ray-tracing intersection test), the cache is checked to determine whether the node attributes are currently stored in the cache.

On a cache miss, the age value of each cache entry is checked, in order (e.g., starting from the left in the table), to determine whether any of the ages have the highest value of "3". If none of the cache blocks is found to have an age of the highest value "3", all of the ages are incremented, and the age value of each cache entry is checked again, in order, to determine whether any of the ages have the highest value "3". This continues until one of the ages is found to have the highest value "3".

If one of the cache blocks is found to have the highest value "3", the contents of the first one of such blocks in the order (e.g., first from the left in the table in this example) is replaced with the requested attribute values from memory, and the age of this block is set to an insertion age that is based on the acceleration structure (based on node level in this example). For example, attribute information for the root node level and the first node level (bounding volumes N1, N2, and N3 in example acceleration structure 500) is inserted with an insertion age of "1". Attribute information for the second node level (bounding volume 4 and primitives P1, P2, and P4 in example acceleration structure 500) is inserted with an insertion age of "2'. Attribute information for the third node level (primitives P3 and P5 in example acceleration structure 500) is inserted with an insertion age of "3".

In some implementations, the insertion age is determined based on an attribute of the node, such as metadata indicating a level within the acceleration data structure, whether it is a child node, an indication of parent and/or child nodes, whether the node is a leaf or root node, etc. In some implementations, the insertion age is determined based on other heuristics, such as the probability of the bounding volume or primitive being intersected by a ray. In some implementations, the probability is determined based on position (i.e., scene placement of the bounding volume or primitive), volume of the bounding volume (e.g., based on the vertices specified in the attributes), surface area of the primitive (e.g., based on the vertices specified in the attributes), and so forth. In some implementations, some nodes are not cached at all. For example, in some implementations, nodes are not cached based on a heuristic that all primitives, primitives below a certain area, bounding volumes below a certain volume, or nodes below a certain threshold chance of intersection, etc., are not cached. In some implementations, the age is set on a hit based on one or more such heuristics. In some implementations, the age of a hit cache block is updated based on such heuristics. In some implementations, both insertion ages and ages updated on cache hit are updated based on such heuristics, which may be the same, or may be different, or of different degree, for insertion ages and cache hit updates.

Inserting a cache entry with an age based on node level in this example can be said to represent a prediction that the cache blocks corresponding to nodes closer to the root have a relatively more "immediate" re-reference interval, and that nodes further away from the root have an increasingly more "distant" re-reference interval—i.e., cache entries closer to the root are likely to be used again soon, and cache entries further away from the root are increasingly less likely to be used again soon (or at all). Accordingly, this example tuned RRIP cache replacement strategy biases cache entries further away from the root to be evicted preferentially to cache entries closer to the root.

The tuned RRIP strategy described above and illustrated with respect to Table 3 provides improved performance over both the LRU strategy of Table 1, and the non-tuned RRIP strategy of Table 3 This is illustrated by the relatively lesser amount of thrash illustrated in Table 3 as compared with Tables 1 and 2, where there are fewer cache misses marked "Miss***" indicating attributes that were previously cached and evicted. The improved performance is also illustrated by the relatively fewer number of cache misses overall.

Figure 6:
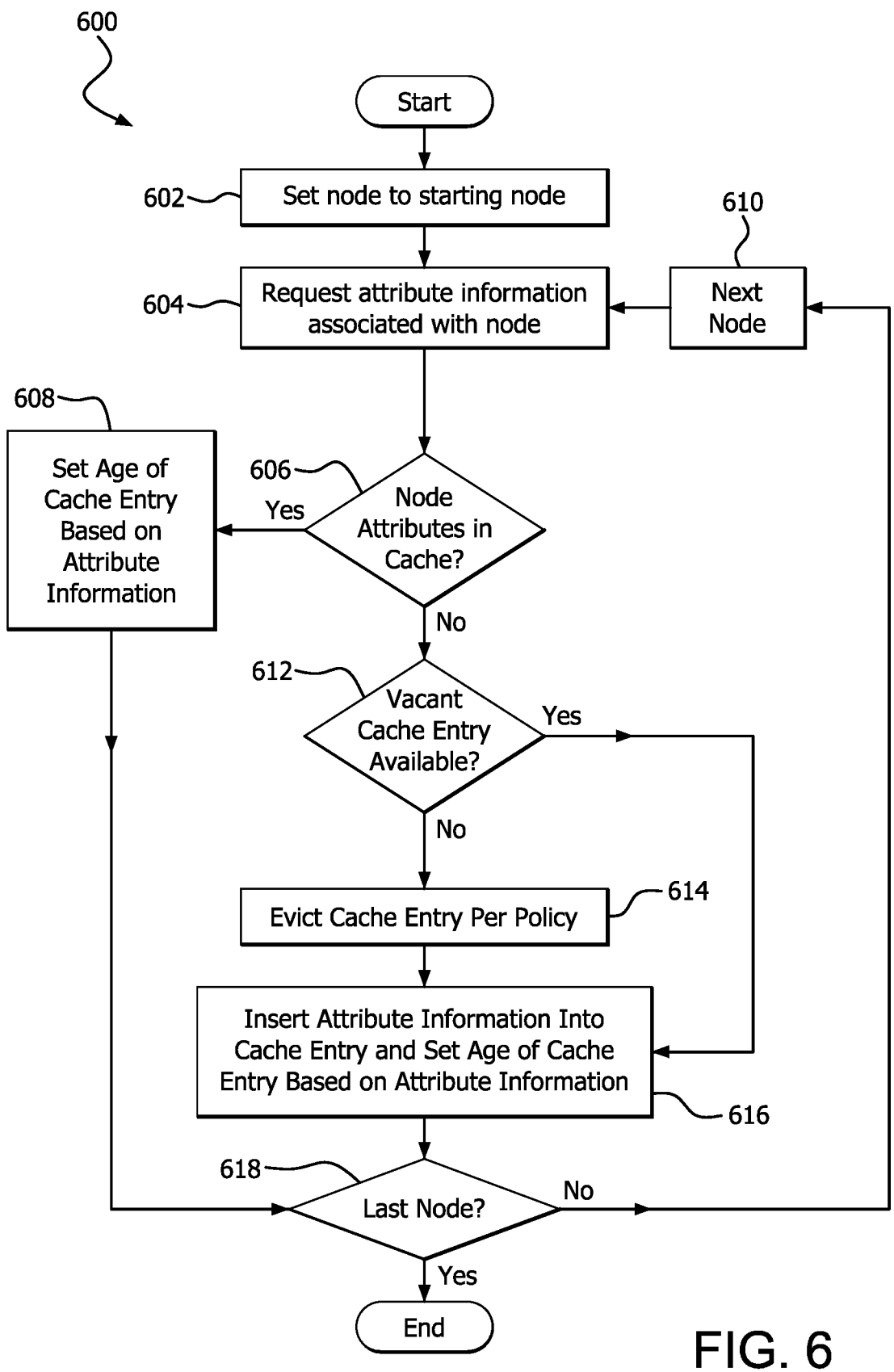
FIG. 6 is a flow chart illustrating an example cache replacement policy based on an acceleration data structure.

FIG. 6 is a flow chart illustrating an example process 600 for implementing a cache replacement policy based on an acceleration data structure. Process 600 is implementable using any suitable hardware, such as shown and described with respect to FIGS. 1-3. For example, in some implementations, process 600 is implemented using accelerated processing device 116 as shown and described with respect to FIG. 2. Process 600 is illustratively described with respect to one possible permutation of the cache replacement policy shown and described with respect to Table 3. It is noted that any other suitable cache replacement policy is usable with process 600.

In step 602, the process begins with a starting node of an acceleration data structure. In this example, the starting node is bounding volume N1, shown and described with respect to FIGS. 4 and 5. The current node is tracked in any suitable manner, such as using a counter, pointer, flag, stack, or the like.

In step 604, attribute information is requested for the current node. For example, in some implementations, the processor (e.g., APD 116 shown and described with respect to FIG. 2) issues a memory request (e.g., to memory 104 as shown and described with respect to FIG. 2) for attributes of bounding volume N1, where the attributes include x, y, z, position information and metadata indicating a position of bounding volume N1 in acceleration data structure 500 (shown and described with respect to FIG. 5).

On condition 606 that the attributes of bounding volume N1 are already cached (i.e., on a cache hit), an age associated with the cache entry in which the attributes are stored is set or modified according to the per-node adjusted policy in step 608, on a condition 618 that the current node is the last node in the acceleration structure, the process ends, otherwise the current node is advanced to the next node in step 610, and the process continues at step 604. It is noted that in 610, the next node is determined in any suitable manner, such as further described herein. For example, the next node is determined based on the position of the current node in the acceleration data structure in some implementations. In some implementations, the position is determined based on metadata of the attributes of the node. In some implementations, the next node is determined based on a combination of the results of an intersection test and the position of the node in the acceleration data structure. Any suitable determination is possible in other implementations.

In some implementations, the age is set in step 608 based simply on the cache hit (e.g., is reset to 0 or another specific value based simply on the re-reference to this cache entry). In other implementations, the age is set based on the attribute information. For example, in some implementations, the age is set based on the re-reference to this cache entry and its level within the acceleration data structure, e.g., as indicated by metadata in the attribute information. In some such examples, the age is set to a value of 0 on a hit where the metadata indicates that the node is a root node of the acceleration data structure, to a value of 3 on a hit where the metadata indicates that the node is a leaf node of the acceleration data structure, or to a value of 2 on a hit where the metadata indicates that the node is neither a root node nor a leaf node. In other example, the age on hit is decremented according to a per-node specified value. These ages are simply convenient examples. In other implementations, any suitable age is possible to set based on the cache hit and/or the metadata information derived from attributes and acceleration structure organization.

On condition 606 that the attributes of bounding volume N1 are not cached (i.e., on a cache miss), if no vacant cache entry is available, a cache entry is evicted from the cache in step 614 based on the cache replacement policy to make room for the attributes of bounding volume N1, and the attributes are inserted into the cache entry. Some implementations implement the tuned RRIP cache replacement policy described with respect to Table 3.

In either case, an age associated with the cache entry in which the attributes are stored is set in step 616. In some implementations, the age is set to an "insertion age" in step 616 based simply on the cache miss (e.g., is set to 2 or another specific value based simply on the insertion of the attributes to this cache entry in response to the cache miss). In other implementations, the age is set based on the metadata information derived from attributes and acceleration structure organization. For example, in some implementations, the age is set based on the insertion to this cache entry and its level within the acceleration data structure, e.g., as indicated by metadata in the attribute information. In some such examples, the age is set to a value of 0 on a miss where the metadata indicates that the node is a root node of the acceleration data structure, to a value of 3 on a miss where the metadata indicates that the node is a leaf node of the acceleration data structure, or to a value of 1 or 2 on a hit where the metadata indicates that the node is neither a root node nor a leaf node. These ages are simply examples. In other implementations, any suitable age is possible to set based on the cache miss and/or the attribute information.

After the attribute information is inserted into the cache entry and the age of the cache entry is set, on a condition 618 that the current node is the last node in the acceleration structure, the process ends. Otherwise, on condition 618 that the current node is not the last node to be traversed in the acceleration structure, the current node is advanced to the next node in step 610 (e.g., to node N2 in the example described with respect to FIG. 5 and/or Table 3), and the process continues at step 604.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processor configured to implement a cache replacement policy, comprising:
    circuitry configured to issue a memory request for attribute information associated with a node in an acceleration data structure; and
    circuitry configured to, responsive to the memory request causing a cache miss, insert the attribute information associated with the node into a cache entry of the cache, and set an age associated with the cache entry to a value based on the attribute information;
    wherein the attribute information associated with the node indicates a level of the node within the acceleration data structure.

2. The processor of claim 1, wherein the attribute information comprises metadata associated with the acceleration data structure and the age is set based on the metadata.

3. The processor of claim 1, wherein the attribute information comprises information associated with a level of the node within the acceleration data structure and the age is set based on the information associated with the level of the node.

4. The processor of claim 1, wherein the attribute information comprises information associated with a parent of the node within the acceleration data structure and the age is set based on the information associated with the information associated with the parent.

5. The processor of claim 1, further comprising circuitry configured to, responsive to the memory request hitting the cache, set the age associated with the cache entry to a value based on the attribute information.

6. The processor of claim 1, further comprising circuitry configured to, responsive to the memory request hitting the cache, set the age associated with the cache entry to a value associated with a cache hit.

7. The processor of claim 1, further comprising circuitry configured to, responsive to the memory request missing the cache, evict information from the cache entry prior to inserting the attribute information associated with the node into the cache entry.

8. The processor of claim 1, further comprising circuitry configured to, responsive to the memory request missing the cache, determine the cache entry from among a plurality of entries of the cache based on the age associated with the cache entry.

9. A method for implementing a cache replacement policy, the method comprising:
    issuing a memory request for attribute information associated with a node in an acceleration data structure; and
    responsive to the memory request causing a cache miss, inserting the attribute information associated with the node into a cache entry of the cache, and setting an age associated with the cache entry to a value based on the attribute informations;
    wherein the attribute information associated with the node indicates a level of the node within the acceleration data structure.

10. The method of claim 9, wherein the attribute information comprises metadata associated with the acceleration data structure and the age is set based on the metadata.

11. The method of claim 9, wherein the attribute information comprises information associated with a level of the node within the acceleration data structure and the age is set based on the information associated with the level of the node.

12. The method of claim 9, wherein the attribute information comprises information associated with a parent of the node within the acceleration data structure and the age is set based on the information associated with the information associated with the parent.

13. The method of claim 9, further comprising, responsive to the memory request hitting the cache, setting the age associated with the cache entry to a value based on the attribute information.

14. The method of claim 9, further comprising, responsive to the memory request hitting the cache, setting the age associated with the cache entry to a value associated with a cache hit.

15. The method of claim 9, further comprising, responsive to the memory request missing the cache, evicting information from the cache entry prior to inserting the attribute information associated with the node into the cache entry.

16. The method of claim 9, further comprising, responsive to the memory request missing the cache, determining the cache entry from among a plurality of entries of the cache based on the age associated with the cache entry.

17. A processor configured to perform ray tracing, comprising:
 circuitry configured to cast a ray through a three-dimensional (3D) model space;
 circuitry configured to determine an intersection between the ray and a primitive within the 3D model space, wherein the primitive is associated with a node in an acceleration data structure;
 circuitry configured to issue a memory request for attribute information associated with the primitive; and
 circuitry configured to, responsive to the memory request causing a cache miss, insert the attribute information associated with the primitive into a cache entry of the cache, and to set an age associated with the cache entry to a value based on the attribute information;
 wherein the attribute information associated with the node indicates a level of the node within the acceleration data structure.

18. The processor of claim 17, wherein the attribute information comprises metadata associated with the acceleration data structure and the age is set based on the metadata.

19. The processor of claim 17, wherein the attribute information comprises information associated with a level of the node within the acceleration data structure and the age is set based on the information associated with the level of the node.

20. The processor of claim 17, wherein the attribute information comprises information associated with a parent of the node within the acceleration data structure and the age is set based on the information associated with the information associated with the parent.

* * * * *